United States Patent
Tsujimura et al.

(10) Patent No.: US 11,245,131 B2
(45) Date of Patent: Feb. 8, 2022

(54) SOLID ELECTROLYTE AND LITHIUM BATTERY INCLUDING THE SAME

(71) Applicant: Samsung Electronics Co., Ltd., Suwon-si (KR)

(72) Inventors: Tomoyuki Tsujimura, Yokohama (JP); Naoki Suzuki, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 359 days.

(21) Appl. No.: 15/354,614

(22) Filed: Nov. 17, 2016

(65) Prior Publication Data

US 2017/0187066 A1 Jun. 29, 2017

(30) Foreign Application Priority Data

Dec. 25, 2015 (JP) .............................. JP2015-255090
Jun. 8, 2016 (KR) ........................ 10-2016-0070973

(51) Int. Cl.
*H01M 10/0562* (2010.01)
*H01M 10/052* (2010.01)
*H01M 4/62* (2006.01)

(52) U.S. Cl.
CPC ..... *H01M 10/0562* (2013.01); *H01M 10/052* (2013.01); *H01M 4/62* (2013.01); *H01M 4/625* (2013.01); *H01M 2300/0068* (2013.01)

(58) Field of Classification Search
None
See application file for complete search history.

(56) References Cited

U.S. PATENT DOCUMENTS

| 8,075,865 | B2 | 12/2011 | Deiseroth et al. |
| 8,962,194 | B2 | 2/2015 | Senga et al. |
| 8,993,176 | B2 | 3/2015 | Kato et al. |
| 9,484,597 | B2 | 11/2016 | Ohtomo et al. |

(Continued)

FOREIGN PATENT DOCUMENTS

| CN | 102372275 A | 3/2012 |
| CN | 104466239 A | 3/2015 |

(Continued)

OTHER PUBLICATIONS

Ukawa et al., "Characterization of argyrodite-type Li6PS5CI1-xBrx solid electrolytes", Meeting of the Electrochemical Society of Japan, 2015.

(Continued)

*Primary Examiner* — Dustin Q Dam
(74) *Attorney, Agent, or Firm* — Cantor Colburn LLP

(57) ABSTRACT

A solid electrolyte for an all-solid secondary battery, the solid electrolyte including: Li, S, P, an M1 element, and an M2 element, wherein the M1 element is at least one element selected from Na, K, Rb, Sc, Fr, and the M2 element is at least one element selected from F, Cl, Br, I, molar amounts of lithium and the M1 element satisfy $0<M1/(Li+M1)\leq 0.07$, and the solid electrolyte has peaks at positions of $15.42°\pm0.50°$ $2\theta$, $17.87°$ degrees$\pm0.50°$ degrees $2\theta$, $25.48°$ degrees$\pm0.50°$ degrees $2\theta$, $30.01°$ degrees$\pm0.50°$ $2\theta$, and $31.38°\pm0.50°$ $2\theta$ when analyzed by X-ray diffraction using CuKα radiation.

14 Claims, 6 Drawing Sheets

(56) References Cited

U.S. PATENT DOCUMENTS

| | | | |
|---|---|---|---|
| 2011/0081580 A1 | 4/2011 | Stadler et al. | |
| 2014/0197351 A1* | 7/2014 | Balagopal | H01M 10/056 252/62.2 |
| 2014/0302382 A1 | 10/2014 | Kambara et al. | |
| 2014/0363745 A1 | 12/2014 | Hirayama et al. | |
| 2015/0171431 A1* | 6/2015 | Yamada | H01M 4/70 429/163 |
| 2015/0270571 A1 | 9/2015 | Kambara et al. | |
| 2015/0295274 A1 | 10/2015 | Engel et al. | |
| 2015/0333367 A1 | 11/2015 | Kato et al. | |
| 2016/0156064 A1 | 6/2016 | Miyashita et al. | |
| 2016/0240886 A1 | 8/2016 | Yamasaki et al. | |

FOREIGN PATENT DOCUMENTS

| | | | |
|---|---|---|---|
| JP | 2010201110 A | 9/2010 | |
| JP | 201196630 A | 5/2011 | |
| JP | 2012104279 A | 5/2012 | |
| JP | 2013016423 A | 1/2013 | |
| JP | 2013037897 A | 2/2013 | |
| JP | 2013149599 A | 8/2013 | |
| JP | 2013201110 A | 10/2013 | |
| JP | 2014028717 A | 2/2014 | |
| JP | 2014029796 A | 2/2014 | |
| JP | 2014093261 A | 5/2014 | |
| JP | 5720753 B2 | 4/2015 | |
| JP | 2015072783 A | 4/2015 | |
| JP | 2015076324 A | 4/2015 | |
| JP | 2015088226 A | 5/2015 | |
| JP | 2015220015 A | 12/2015 | |
| WO | 2005078740 A1 | 8/2005 | |
| WO | 2009047254 A1 | 4/2009 | |
| WO | 2013069243 A1 | 5/2013 | |
| WO | 2015011937 A1 | 1/2015 | |
| WO | 2015012042 A1 | 1/2015 | |
| WO | 2012011179 A1 | 1/2016 | |

OTHER PUBLICATIONS

Boulineau et al., "Mechanochemical synthesis of Li-argyrodite $Li_6PS_5X$ (X=Cl, Br, I) as sulfur-based solid electrolytes for all solid state batteries application", Solid State Ionics, 221, 2012, pp. 1-5.

Kanno et al., "Lithium Ionic Conductor Thio-LISICON The $Li_2S$—$GeS_2$—$P_2S_5$ System", Journal of The Electrochemical Society, 148(7), 2001, A.742-A746.

Ujiie et al., "Conductivity of $70Li_2S.30P_2S_5$ glasses-ceramics added with lithium halides", Solid State Ionics, 263, 2014, pp. 57-61.

An Office Action issued by the Japanese Patent Office dated Sep. 17, 2019 in the examination of the Japanese Patent Application No. 2015-255090, which corresponds to the U.S. Appl. No. 15/354,614.

Third party submission issued by the Japanese Patent Office dated Apr. 22, 2020 in the examination of the Japanese Patent Application No. 2015-255090, which corresponds to U.S. Appl. No. 15/354,614.

Yutaka Kinose, et al., "Development of Lithium Sulfide for Solid Electrolyte," Creative, Nippon Chemical Industrial Co., Ltd., 2007, No. 8, pp. 33-39.

* cited by examiner

SOLID ELECTROLYTE AND LITHIUM BATTERY INCLUDING THE SAME

CROSS-REFERENCE TO RELATED APPLICATION

This application claims the benefit of and priority to Korean Patent Application No. 10-2016-0070973, filed on Jun. 8, 2016, in the Korean Intellectual Property Office, and Japanese Patent Application No. 2015-255090, filed on Dec. 25, 2015, in the Japanese Patent Office, and all the benefits accruing therefrom under 35 U.S.C. § 119, the contents of which are incorporated herein in their entirety by reference.

BACKGROUND

1. Field

The present disclosure relates to a solid electrolyte, a lithium battery including the solid electrolyte, and a method of preparing the solid electrolyte.

2. Description of the Related Art

An all-solidified lithium battery including a solid electrolyte as an electrolyte is considered as having excellent safety since a flammable organic solvent is not used in the battery. In addition, the battery has been examined as a promising lithium ion battery. As a solid electrolyte material used in the solid electrolyte, a sulfide-based solid electrolyte has been known, for example in International Patent Publication Nos. WO 2009/047254, International Patent Publication No. WO 2015/011937, International Patent Publication No. WO 2015/012042, Japanese Patent No. 2011-96630, Japanese Patent No. 2013-201110, Japanese Patent No. 2015-72783, and Japanese Patent No. 2013-37897.

Nonetheless, there remains a need for an improved solid electrolyte that is stable with respect to lithium and has suitable ion conductivity.

SUMMARY

Provided is a solid electrolyte that is stable with respect to lithium metal and, at the same time, has a desirable ion conductivity. Additional aspects will be set forth in part in the description which follows and, in part, will be apparent from the description, or may be learned by practice of the presented embodiments.

According to an aspect of an embodiment, a solid electrolyte for an all-solid secondary battery includes Li, S, P, an M1 element, and an M2 element, wherein the M1 element is at least one element selected from Na, K, Rb, Cs, Fr, and a combination thereof, the M2 element is at least one element selected from F, Cl, Br, I, and a combination thereof, molar amounts of Li and the M1 element satisfy $0<M1/(Li+M1) \leq 0.07$, and the solid electrolyte has peaks at positions of $15.42°\pm0.50°$ $2\theta$, $17.87°\pm0.50°$ $2\theta$, $25.48°\pm0.50°$ $2\theta$, $30.01°\pm0.50°$ $2\theta$, and $31.38°\pm0.50°$ $2\theta$ when analyzed by X-ray diffraction using CuK$\alpha$ radiation.

According to an aspect of another embodiment, a secondary battery includes a cathode including a cathode active material; an anode including an anode active material; and a solid electrolyte layer including the solid electrolyte.

Also disclosed is a method of preparing the solid electrolyte, the method including: mechanically milling a mixture comprising $Li_2S$, $P_2S_5$, and $M1_2S$ and LiM2, or M1M2 to obtain a glass; and heat-treating the glass at a glass transition temperature or greater to convert the glass into and ion conductive glass ceramic and obtain the solid electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
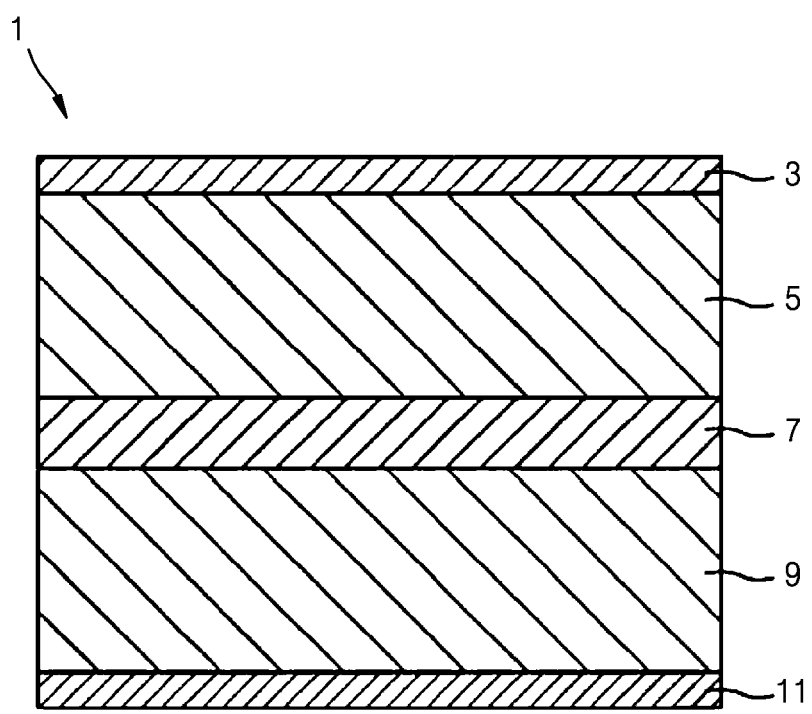
FIG. 1 is a cross-sectional view of an all-solid secondary battery according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Similar reference numerals designate similar elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Hereinafter, one or more embodiments of the present invention will be described by referring to drawings. The descriptions of the embodiments are fundamentally provided herein as examples but are not intended to limit the equivalent or the use thereof.

A C rate means a current which will discharge a battery in one hour, e.g., a C rate for a battery having a discharge capacity of 1.6 ampere-hours would be 1.6 amperes.

As used herein, the term "alkali metal" denotes an element that belongs to Group 1 in the Periodic Table.

As used herein, the term "alkaline earth metal" denotes an element that belongs to Group 2 in the Periodic Table.

As used herein, the term "rare earth element" denotes an element that belongs to the lanthanide series, and also includes scandium and yttrium.

As used herein, the term "Group XIII element" denotes an element that belongs to Group 13 in the Periodic Table.

As used herein, the term "Group XIV element" denotes an element that belongs to Group 14 in the Periodic Table.

Li-sulfide-based solid electrolytes may be used to resolve various problems, but ion conductivity needs to be increased. Until present, a solid electrolyte including Ge is expected to have the highest ion conductivity ($10^{-2}$ Siemens per centimeter (S/cm)), but the solid electrolyte is unstable as the solid electrolyte is decomposed by lithium metal. Although many solid electrolytes have an ion conductivity of $10^{-4}$ S/cm and thus are stable with respect to lithium metal, a sulfide-based solid electrolyte of an Argyrodite structure, $Li_{6-x}PS_5Cl_x$, has an ion conductivity of $10^{-3}$ S/cm.

The present inventors have performed various examinations to find a material that is stable with respect to lithium metal and has a high ion conductivity by modifying the Argyrodite structure. As a result, the present inventors have discovered that ion conductivity increases by replacing some Li with another alkali metal.

According to an embodiment, a solid electrolyte includes Li, S, P, an M1 element, and an M2 element.

In an embodiment, in the solid electrolyte the M1 element may be at least one element selected from alkali metals. In another embodiment, the M1 element may be at least one element selected from Na, K, Rb, Cs, and Fr. Also, in another embodiment, the M1 element may be at least one element selected from Na and K. In another embodiment, the M1 element may be Na.

In an embodiment, in the solid electrolyte, the M2 element may be at least one element selected from Cl, Br, I, and F. In another embodiment, the M2 element may be Cl.

In an embodiment, in the solid electrolyte, a molar ratio of the Li element and the M1 element may satisfy: 0<M1/(Li+M1)≤0.07.

In an embodiment, the solid electrolyte may have peaks at positions of 15.42°±0.50° 2θ, 17.87°±0.50° 2θ, 25.48°±0.50° 2θ, 30.01°±0.50° 2θ, and 31.38°±0.50° 2θ when analyzed by X-ray diffraction using CuKα radiation. In an embodiment, since the solid electrolyte has an Argyrodite structure, the solid electrolyte may have X-ray diffraction peaks.

In an embodiment, in the solid electrolyte, when some Li is replaced with another alkali metal (e.g., at least one of Na and K), the reason why ion conductivity increases is assumed to be as follows. Without being bound by theory, since a radius of the replaced alkali metal ion is larger than a radius of a lithium ion, when some of the Li is replaced with another alkali metal ion, the solid electrolyte may easily diffuse Li, compared to the case when a crystal lattice of the solid electrolyte is only constituted with Li, and thus an ion conduction path of Li may increase, which may result in increasing conductivity. Also, an amount of the replaced alkali metal M1 may be a value represented by a molar ratio of M1/(Li+M1) (also, referred to as a cation ratio) which may be in a range of greater than 0 to about 0.07. When the cation ratio is greater than 0.07, ion conductivity may decrease.

An amount of the alkali metal other than Li is substituted for Li and introduced into a lattice. However, with increasing the substituting of the alkali metal other than Li, the increase of amounts of LiCl and $Li_2S$ was identified. These phases are not ion conductive materials, thus ion conductivity is assumed to be decreased. Without being bound by theory, this is the reason why the ion conductivity is assumed to be decreased when a cation ratio is greater than about 0.07. For example, when the alkali metal other than Li is Na, an impurity peak is observed at a position of 30.01°±0.50° 2θ in the X-ray diffraction measurement using CuKα radiation, and an intensity of the impurity peak is less than a predetermined intensity threshold.

In an embodiment, the solid electrolyte has a composition of Formula 1, and M1 may be Na.

$$(Li_{1-x}M1_x)_{7-y}PS_{6-y}M2_y \quad \text{Formula 1}$$

wherein $0 < x \leq 0.07$ and $0 \leq y \leq 2$.

According to another embodiment, the solid electrolyte is prepared using a preparation method including mechanically milling a raw material mixture including $Li_2S$, $P_2S_5$, and $M1_2S$ and $LiM_2$, or $M1M2$ at a predetermined ratio to obtain glass; and heat-treating the glass at a temperature equal to or greater than a glass transition temperature of the glass to convert the glass into ion conductive glass ceramic. When the glass is first obtained by performing the mechanical milling and then heat-treating the resultant to convert the glass into glass ceramic, a solid electrolyte may be stable and may have desirable ion conductivity.

According to another embodiment, a structure of an all-solid battery including the solid electrolyte will be described. FIG. 1 is a cross-sectional view of an all-solid battery 1 prepared according to one aspect of an embodiment. FIG. 1 is illustrated schematically for a better understanding of the structure of the all-solid battery 1, and thus a ratio of thicknesses of the layers may be different from the illustration in FIG. 1.

As shown in FIG. 1, the all-solid battery 1 according to an embodiment may include an anode current collector layer 11, an anode layer 9, a solid electrolyte layer 7, a cathode layer 5, and a cathode current collector layer 3 that are sequentially stacked from the bottom in this stated order. The solid electrolyte layer 7 between the anode layer 9 and the cathode layer 5 directly contacts the anode layer 9 and the cathode layer 5. The anode layer 9, the solid electrolyte layer 7, and the cathode layer 5 are each formed of a powder, which may be press-molded. Also, the all-solid battery 1 may have a flat surface but is not limited thereto and may have, for instance, a shape of a circle or a quadrangle.

As used herein, "all-solid" means that a solvent, i.e., a compound having a vapor pressure of greater than 100 pascals at 20° C., is not included.

The anode current collector layer 11 includes a conductor, which may be formed of a metal, for example, copper (Cu), nickel (Ni), stainless steel, or nickel-plated steel. For example, a thickness of the anode current collector layer 11 may be in a range of about 10 micrometers (μm) to about 20 μm.

The anode layer 9 may include an anode active material in the form of a powder. For example, an average particle diameter of the anode active material may be in a range of about 5 μm to about 20 μm. For example, the amount of the anode active material in the anode layer 9 may be in a range of about 60 weight percent (wt %) to about 95 wt %. The anode layer 9 may further include a binder, a solid electrolyte material in the form of powder, or a conducting material that do not generate a chemical reaction with the solid electrolyte layer 7.

The anode active material may be any suitable anode active material for a lithium battery available in the art. For example, the anode active material may include at least one material selected from lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y' alloy (where Y' is an alkali metal, an alkaline earth metal, a Group XIII element, a Group XIV element, a transition metal, a rare earth element, or a combination thereof except for Si), and a Sn—Y' alloy (where Y' is an alkali metal, an alkali earth metal, a Group XIII element, a Group XIV element, a transition metal, a rare earth element, or a combination thereof, except for Sn). In an embodiment, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

Non-limiting examples of the transition metal oxides include, but are not limited to a lithium titanium oxide, a vanadium oxide, a lithium vanadium oxide, a niobium oxide, and a combination thereof.

For example, the non-transition metal oxide may be $SnO_2$ or $SiO_x$ (where $0 < x < 2$).

Examples of the carbonaceous material include, but are not limited to, crystalline carbon, amorphous carbon, and mixtures thereof. Examples of the crystalline carbon include, but are not limited to, graphite, such as natural graphite or artificial graphite that is in amorphous, plate, flake, spherical, or fibrous form. Examples of the amorphous carbon include, but are not limited to, soft carbon (carbon sintered at low temperatures), hard carbon, meso-phase pitch carbides, sintered corks, and the like.

The anode active material may be used alone or as a combination of at least two selected therefrom. A thickness of the anode layer 9 may be in a range of about 50 μm to about 300 μm, but embodiments are not limited thereto.

The solid electrolyte layer 7 may include the solid electrolyte described above. For example, an average particle diameter of the solid electrolyte may be in a range of about 1 μm to about 10 μm. In an embodiment, a thickness of the solid electrolyte layer 7 may be in a range of about 10 μm to about 200 μm, but embodiments are not limited thereto.

Without being bound by theory, when the average particle diameter of the solid electrolyte is within the range of about 1 μm to about 10 μm, the binding properties increase during a process for forming a solid electrolyte, which may improve the ion conductivity and lifespan characteristics of solid electrolyte particles.

When the thickness of the solid electrolyte layer 7 is within the range of about 10 μm to about 200 μm, a sufficient migration rate of lithium ions may be secured, and thus a desirable ion conductivity may be achieved.

The cathode layer 5 may include a cathode active material in the form of powder. For example, an average particle diameter of the cathode active material may be in a range of about 2 μm to about 10 μm. For example, an amount of the cathode active material in the cathode layer 5 may be in a range of about 65 wt % to about 95 wt %. The cathode layer 5 may further include a binder, a solid electrolyte material, and a conducting material such as carbon nanofibers (CNFs) that do not generate chemical reactions with the solid electrolyte layer 7. The cathode active material may be a material capable of reversibly intercalating and deintercalating lithium ions. For example, the cathode active material may be at least one composite oxide of lithium with a metal selected from among Co, Mn, Ni, and a combination thereof. In some embodiments, the cathode active material may be a compound represented by one of the following formulae: $Li_aA_{1-b}B^1{}_bD^1{}_2$ (where $0.90 \leq a \leq 1.8$ and $0 \leq b \leq 0.5$); $Li_a$ $E_{1-b}B^1{}_bO_{2-c}D^1{}_c$ (where $0.90 \le a \le 1.8$, $0 \le b \le 0.5$, and $0 \le c \le 0.05$); $LiE_{2-b}B^1{}_bO_{4-c}D^1{}_c$ (where $0 \le b \le 0.5$ and $0 \le c \le 0.05$); $Li_aNi_{1-b-c}Co_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Co_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Co_bB^1{}_cO_{2-\alpha}F^1{}_2$ (where $0.90 \le a \le 1.8$, $0 \le b \le 0.5$, $0 \le c \le 0.05$, and $0 < \alpha < 2$); $Li_aNi_{1-b-c}Mn_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Mn_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Mn_bB^1{}_cO_{2-\alpha}F^1{}_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_b$-$Co_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae above, A may be selected from nickel (Ni), cobalt (Co), manganese (Mn), and combinations thereof; $B^1$ may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; $F^1$ may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; $I^1$ is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

For example, the cathode active material may be a lithium cobalt oxide (LCO), a lithium nickel oxide, a lithium nickel cobalt oxide, a lithium nickel cobalt aluminum (NCA) oxide, a lithium nickel cobalt manganese (NCM) oxide, a lithium manganese oxide, a nickel sulfide, a copper sulfide, sulfur, an iron oxide, a vanadium oxide, and a combination thereof. The cathode active material may be used alone or as a combination of at least two selected therefrom. For example, a thickness of the cathode layer 5 may be in a range of about 50 μm to about 350 μm, but embodiments are not limited thereto.

The cathode current collector layer 3 is formed of a conductor, for example, a metal such as aluminum (Al) or stainless steel. For example, a thickness of the cathode current collector 3 may be in a range of about 10 μm to about 20 μm, but embodiments are not limited thereto.

Example 1

First, reagents of $Li_2S$, $Na_2S$, $P_2S_5$, and LiCl were measured to form the desired composition $(Li_{5.635}Na_{0.115})PS_{4.75}Cl_{1.25}$, and a mechanical milling treatment was performed thereon to mix the reagents in a planetary ball mill for 20 hours. The mechanical milling treatment was performed at a rotation rate of 380 rpm, at room temperature (about 25° C.), and in an argon atmosphere.

300 mg of a powder material having a composition of $(Li_{5.635}Na_{0.115})PS_{4.75}Cl_{1.25}$ (a cation ratio=0.02) as obtained from the mechanical milling treatment was pressed (at a pressure of about 400 mega pascals per square centimeter (MPa/cm²)) to obtain a pellet having a diameter of about 13 mm and a thickness of about 0.8 mm. The pellet thus obtained was coated with a gold film and placed into a carbon furnace, and the carbon furnace was vacuum-sealed by using a quartz glass tube. A temperature of the vacuum-sealed pellet was increased from room temperature to 550° C. using an electric furnace at a rate of 1.0° C./min, heat-treated at 550° C. for 6 hours, and then cooled to room temperature at a rate of 1.0° C./min to obtain a sample (a solid electrolyte) of Example 1.

Figure 2:
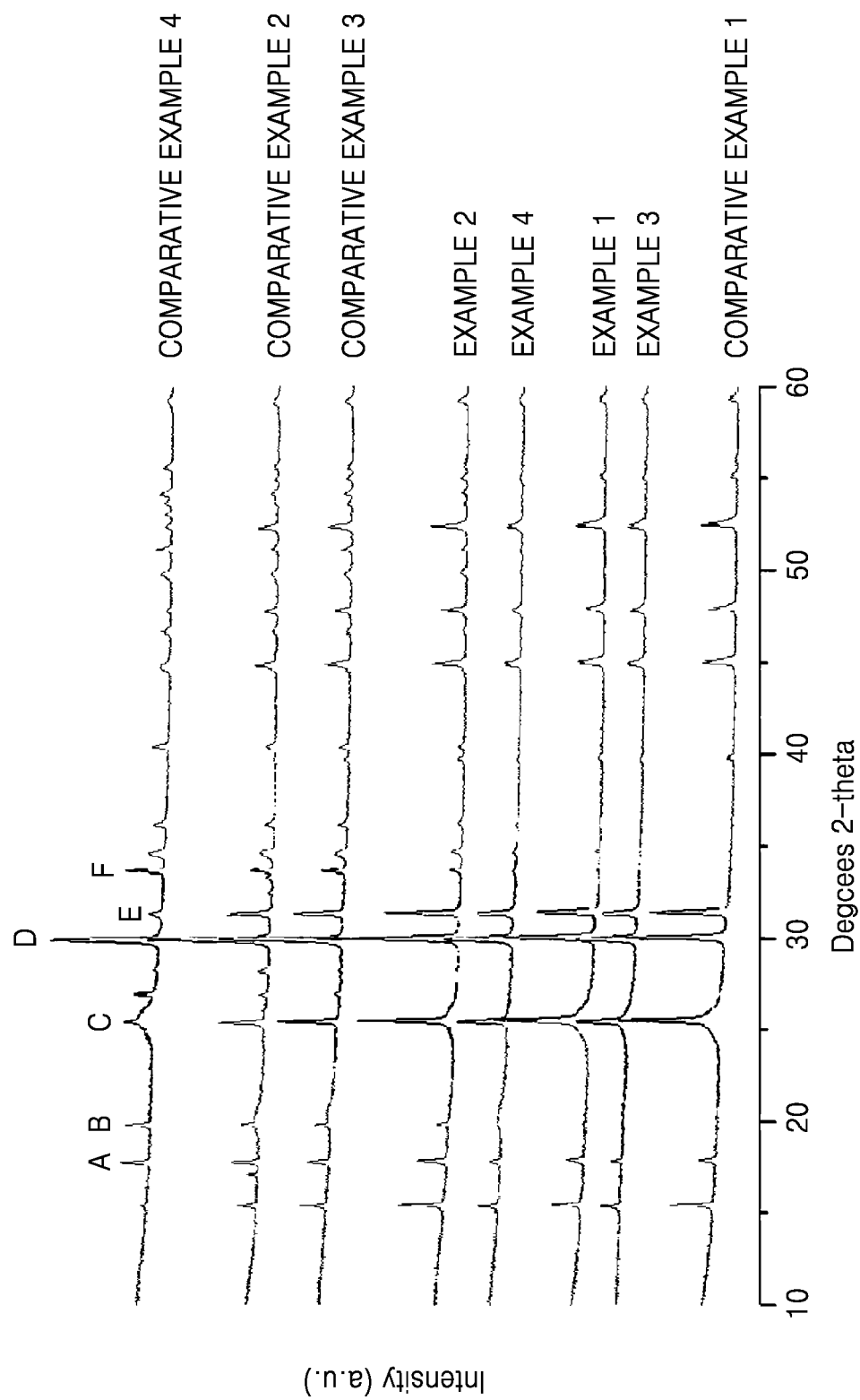
FIG. 2 is a graph of intensity (arbitrary units) versus diffraction angle (degrees 2-theta ($2\theta$)) showing the results of an X-ray diffraction measurements using CuK$\alpha$ radiation performed on solid electrolytes prepared in Examples 1 to 4 and Comparative Examples 1 to 4 of the present disclosure.

The sample was pulverized by using an agate mortar, X-ray crystal diffraction using CuKα radiation was performed thereon, and formation of the desired crystals having an Argyrodite structure was confirmed (FIG. 2). Also, in FIG. 2, peak A was a peak at 15.42°±0.50° 2θ, peak B was a peak at 17.87°±0.50° 2θ, peak C was a peak at 25.48°±0.50° 2θ, peak D was a peak at 30.01°±0.50° 2θ, and peak E was a peak at 31.38°±0.50° 2θ.

Also, a base line was removed by using the X-ray diffraction pattern measured by this method. When the maximum intensity of the peak D at 30.01°±0.50° 2θ was referred to as IA and the maximum intensity of the peak F at 33.65°±0.50° 2θ was referred to as IB, IB/IA was 0.013.

The ion conductivity of the sample was measured as follows. The sample was pulverized by using an agate mortar and was pressed (at a pressure of 400 MPa/cm²) to prepare a pellet. Also, an In foil (at a thickness of 50 μm) was provided on both surfaces of the pellet to prepare a pellet for measuring ion conductivity. The pellet for measuring ion conductivity exhibited an ion conductivity of $4.5 \times 10^{-3}$ siemens per centimeter (S/cm) at room temperature.

Example 2

A sample of Example 2 was prepared the same as in Example 1, except that an amount of Na and the corresponding amount of Li added to the sample were different from those used in Example 1, but a material composition, a process, and a measurement method were the same as those used in Example 1.

In Example 2, reagents of $Li_2S$, $Na_2S$, $P_2S_5$, and LiCl were measured to form the desired composition $(Li_{5.4625}Na_{0.2875})PS_{4.75}Cl_{1.25}$, and a mechanical milling treatment and heat-treatment were performed thereon to prepare a sample (a solid electrolyte) of Example 2 having a composition of $(Li_{5.4625}Na_{0.2875})PS_{4.75}Cl_{1.25}$ (a cation ratio=0.05).

X-ray crystal diffraction using CuKα radiation was performed on the sample, and formation of the desired crystals having an Argyrodite structure was confirmed (FIG. 2). Also, in FIG. 2, IB/IA was 0.083. An ion conductivity of the sample was measured at room temperature, and the ion conductivity of the sample was confirmed to be $3.1 \times 10^{-3}$ S/cm.

Example 3

A sample of Example 3 was prepared the same as in Example 1, except that the amount of Na and the corresponding amount of Li added to the sample were different from those used in Example 1, but a material composition, a process, and a measurement method were the same as those used in Example 1.

In Example 3, reagents of $Li_2S$, $Na_2S$, $P_2S_5$, and LiCl were measured to form the desired composition $(Li_{5.6925}Na_{0.0575})PS_{4.75}Cl_{1.25}$, and a mechanical milling treatment and heat-treatment were performed thereon to prepare a sample (a solid electrolyte) of Example 3 having a composition of $(Li_{5.6925}Na_{0.0575})PS_{4.75}Cl_{1.25}$ (a cation ratio=0.01).

X-ray crystal diffraction using CuKα radiation was performed on the sample, and formation of the desired crystals having an Argyrodite structure was confirmed (FIG. 2). Also, in FIG. 2, IB/IA was 0.0184. An ion conductivity of the sample was measured at room temperature, and the ion conductivity of the sample was confirmed to be $5.1\times10^{-3}$ S/cm.

Example 4

A sample of Example 4 was prepared the same as in Example 1, except that the amount of Na and the corresponding amount of Li added to the sample were different from those used in Example 1, but a material composition, a process, and a measurement method were the same as those used in Example 1.

In Example 4, reagents of $Li_2S$, $Na_2S$, $P_2S_5$, and LiCl were measured to form the desired composition $(Li_{5.5775}Na_{0.1725})PS_{4.75}Cl_{1.25}$, and a mechanical milling treatment and heat-treatment were performed thereon to prepare a sample (a solid electrolyte) of Example 4 having a composition of $(Li_{5.5775}Na_{0.1725})PS_{4.75}Cl_{1.25}$ (a cation ratio=0.03).

X-ray crystal diffraction using CuKα radiation was performed on the sample, and formation of the desired crystals having an Argyrodite structure was confirmed (FIG. 2). Also, in FIG. 2, IB/IA was 0.0481. An ion conductivity of the sample was measured at room temperature, and the ion conductivity of the sample was confirmed to be $2.8\times10^{-3}$ S/cm.

Example 5

Figure 7A:
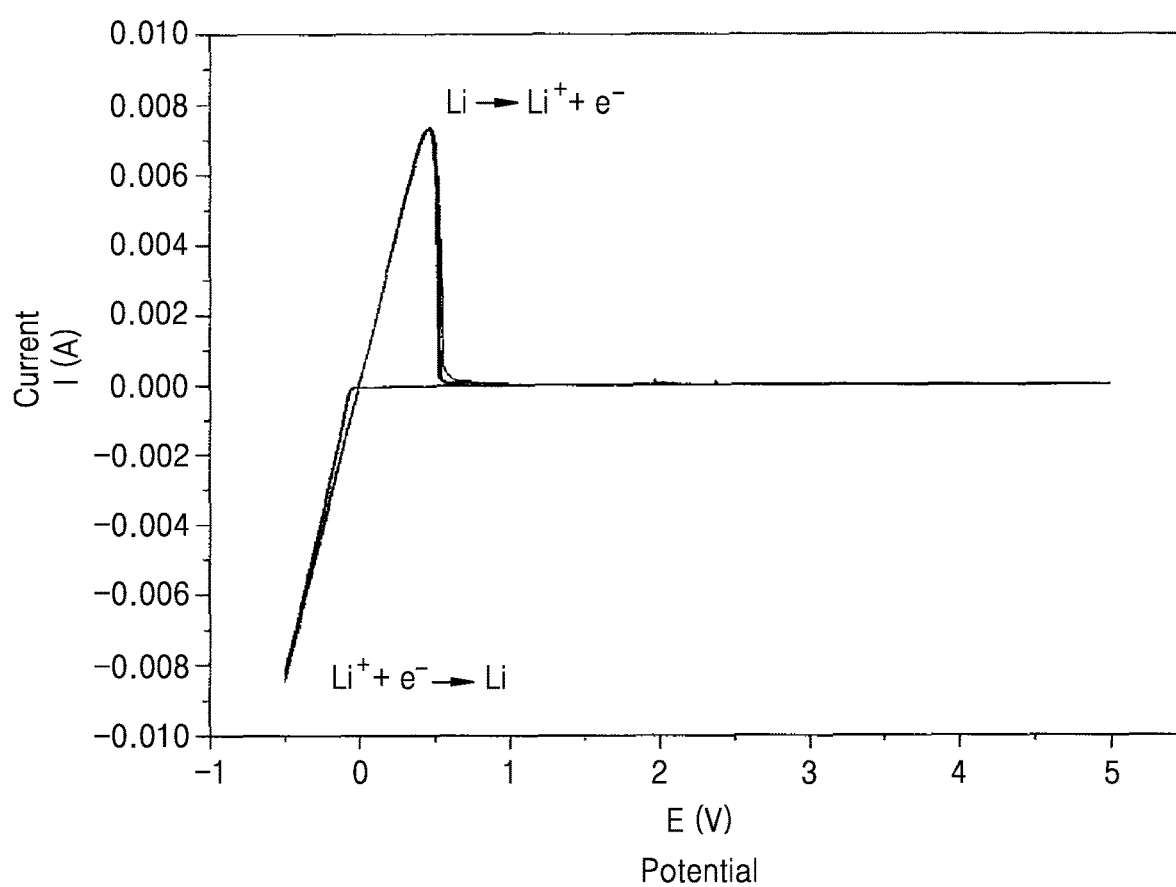
FIG. 7A is a graph of current (amperes, A) versus potential (V), showing the results of cyclic voltammetry (CV) analysis of Example 5.

The sample obtained in Example 3 was pulverized by using an agate mortar and pressed (at a pressure of 400 MPa/cm²) to prepare a pellet. Also, a Li foil and an In foil were provided on the pellet at thicknesses of 100 μm and 500 μm, respectively, to prepare a pellet for a cyclic voltammetry (CV) measurement. The results of the CV measurement are shown in FIG. 7A.

Comparative Example 1

A sample of Comparative Example 1 was prepared the same as in Example 1, except that the sample of Comparative Example 1 only included Li and did not include Na, but a material composition, a process, and a measurement method were the same as those used in Example 1.

In Comparative Example 1, reagents of $Li_2S$, $P_2S_5$, and LiCl were measured to form the desired composition $Li_{5.75}PS_{4.75}Cl_{1.25}$, and a sample (a solid electrolyte) of Comparative Example 1 having a composition of $Li_{5.75}PS_{4.75}Cl_{1.25}$ was obtained in the same manner as in Example 1.

X-ray crystal diffraction using CuKα radiation was performed on the sample, and formation of the desired crystals having an Argyrodite structure was confirmed (FIG. 2). Also, IB/IA was 0.0. An ion conductivity of the sample was measured at room temperature, and the ion conductivity of the sample was confirmed to be $2.3\times10^{-3}$ S/cm.

Comparative Example 2

A sample of Comparative Example 2 was prepared the same as in Example 1, except that the amount of Na and the corresponding amount of Li added to the sample were different from those used in Example 1, but a material composition, a process, and a measurement method were the same as those used in Example 1.

In Comparative Example 2, reagents of $Li_2S$, $Na_2S$, $P_2S_5$, and LiCl were measured to form the desired composition $(Li_{5.175}Na_{0.575})PS_{4.75}Cl_{1.25}$, and a mechanical milling treatment and heat-treatment were performed thereon to prepare a sample (a solid electrolyte) of Comparative Example 2 having a composition of $(Li_{5.175}Na_{0.575})PS_{4.75}Cl_{1.25}$ (a cation ratio=0.10).

X-ray crystal diffraction using CuKα radiation was performed on the sample, and formation of the desired crystals having an Argyrodite structure was confirmed (FIG. 2). Also, IB/IA was 0.182. An ion conductivity of the sample was measured at room temperature, and the ion conductivity of the sample was confirmed to be $1.7\times10^{-4}$ S/cm.

Comparative Example 3

A sample of Comparative Example 3 was prepared the same as in Example 1, except that the amount of Na and the corresponding amount of Li added to the sample were different from those used in Example 1, but a material composition, a process, and a measurement method were the same as those used in Example 1.

In Comparative Example 3, reagents of $Li_2S$, $Na_2S$, $P_2S_5$, and LiCl were measured to form the desired composition $(Li_{5.319}Na_{0.431})PS_{4.75}Cl_{1.25}$, and a mechanical milling treatment and heat-treatment were performed thereon to prepare a sample (a solid electrolyte) of Comparative Example 3 having a composition of $(Li_{5.319}Na_{0.431})PS_{4.75}Cl_{1.25}$ (a cation ratio=0.075).

X-ray crystal diffraction using CuKα radiation was performed on the sample, and formation of the desired crystals having an Argyrodite structure was confirmed (FIG. 2). Also, IB/IA was 0.201. An ion conductivity of the sample was measured at room temperature, and the ion conductivity of the sample was confirmed to be $9.7\times10^{-4}$ S/cm.

Comparative Example 4

A sample of Comparative Example 4 was prepared the same as in Example 1, except that the amount of Na and the corresponding amount of Li added to the sample were different from those used in Example 1, but a material composition, a process, and a measurement method were the same as those used in Example 1.

In Comparative Example 4, reagents of $Li_2S$, $Na_2S$, $P_2S_5$, and LiCl were measured to form the desired composition $(Li_{4.888}Na_{0.863})PS_{4.75}Cl_{1.25}$, and a mechanical milling treatment and heat-treatment were performed thereon to prepare a sample (a solid electrolyte) of Comparative Example 4 having a composition of $(Li_{4.888}Na_{0.863})PS_{4.75}Cl_{1.25}$ (a cation ratio=0.15).

X-ray crystal diffraction using CuKα radiation was performed on the sample, and formation of the desired crystals having an Argyrodite structure was confirmed (FIG. 2). Also, IB/IA was 0.359. An ion conductivity of the sample was measured at room temperature, and the ion conductivity of the sample was confirmed to be $3.3 \times 10^{-6}$ S/cm.

Comparative Example 5

Figure 7B:
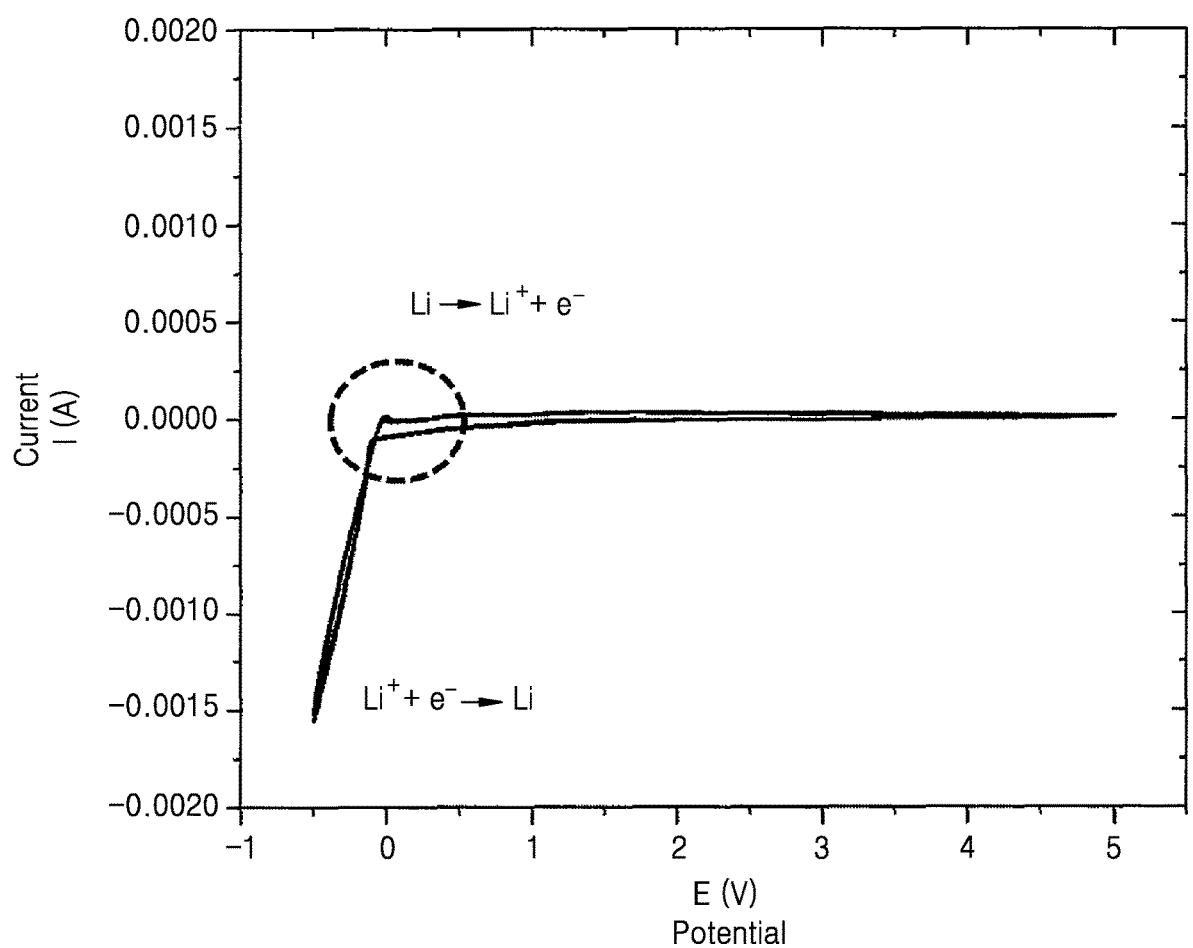
FIG. 7B is a graph of current (A) versus potential (V), showing the results of cyclic voltammetry (CV) analysis of Comparative Example 5.

A commercially available sample ($Li_{10}SnP_2S_{12}$) was pulverized by using an agate mortar and pressed (at a pressure of 400 MPa/cm$^2$) to prepare a pellet. Also, a Li foil and an In foil were provided on the pellet at thicknesses of 100 μm and 500 μm, respectively, to prepare a pellet for a CV measurement. The results of the CV measurement are shown in FIG. 7B.

Evaluation 1

Compared to the sample of Comparative Example 1, which included Li as an alkali metal but did not include Na, the samples of Examples 1 to 4 including Na and having a cation ratio in a range of about 0.01 to about 0.05 had an ion conductivity that increased about 1.4 fold to 2.2 fold. Ion conductivities of the samples prepared in Comparative Examples 2 to 4 having a cation ratio in a range of about 0.075 to about 0.15 increased only about 0.0015 fold to about 0.42 fold from that of the sample prepared in Comparative Example 1, and it is deemed that this was because the added Na was not all introduced to the Argyrodite structure but some of Na became impurities that suppressed improving ion conductivity.

An ion conductivity of the sample prepared in Comparative Example 3 having a cation ratio of 0.075 was $1.7 \times 10^{-4}$ S/cm, and this was 0.42 fold of that of the sample prepared in Comparative Example 1. The cation ratio at which the ion conductivity improving effect may be exhibited by addition of Na is deemed to be less than 0.075.

Evaluation 2

In Example 5, currents associated with Li dissolution and Li extraction were observed by the C-V (Capacitance-voltage) measurement as a reaction between the solid electrolyte and a Li metal occurred, but, in Comparative Example 5, a Li dissolution current was not observed but only a current indicating Li extraction was observed. This is deemed to be because the solid electrolyte and the Li metal pre-reacted on an interface in the case of Comparative Example 5, which made Li extraction insufficient during the CV measurement, and thus the Li dissolution reaction almost did not occur.

Example 6

In Example 6, a test battery was prepared by using the solid electrolyte of Example 2, and battery characteristics of the test battery were measured.

$LiNi_{0.8}Co_{0.15}Al_{0.05}O_2$ (NCA) as a cathode active material, the solid electrolyte of Example 2, and CNFs as a conducting material were mixed at a ratio of the cathode active material:solid electrolyte:CNFs=83:15:2 wt % to prepare a cathode mixture. Also, a metal lithium foil was used as an anode.

The cathode mixture, the solid electrolyte, and an anode mixture were stacked at amounts of 10 mg, 150 mg, 2 mg, respectively, and pressed at a pressure of 4 tons per square centimeter (ton/cm$^2$) to prepare a test battery. In the test battery, a solid electrolyte was not decomposed by the anode and was stable.

The test battery thus prepared was charged at 25° C. with a constant current of 0.05 C until a voltage of an upper limit was 4.0 volts (V) and discharged with a constant current of 0.05 C until a voltage of a lower limit was 2.5 V to measure an initial battery capacity. Then, the battery was discharged with a current of 0.05 C (FIG. 3), 0.5 C (FIG. 4), or 1 C (FIG. 5) to measure rate characteristics with respect to other batteries. The characteristics of the example according to an embodiment of the present disclosure are shown as G in FIGS. 3 to 5.

Also, while the test battery was charged to a voltage of an upper limit 4.0 V, an impedance of the battery was measured to evaluate a battery internal resistance. An internal resistance of the battery of the example according to an embodiment is shown as G in FIG. 6.

Comparative Example 6

In Comparative Example 6, a test battery was prepared by using the solid electrolyte of Comparative Example 1, and battery characteristics of the test battery were measured. A preparation method of the test battery and a measurement method of the battery characteristics were the same as those used in Example 6. Characteristics and internal resistance of the battery prepared in Comparative Example 6 were shown as H in FIGS. 3 to 6.

Evaluation 3

Figure 3:
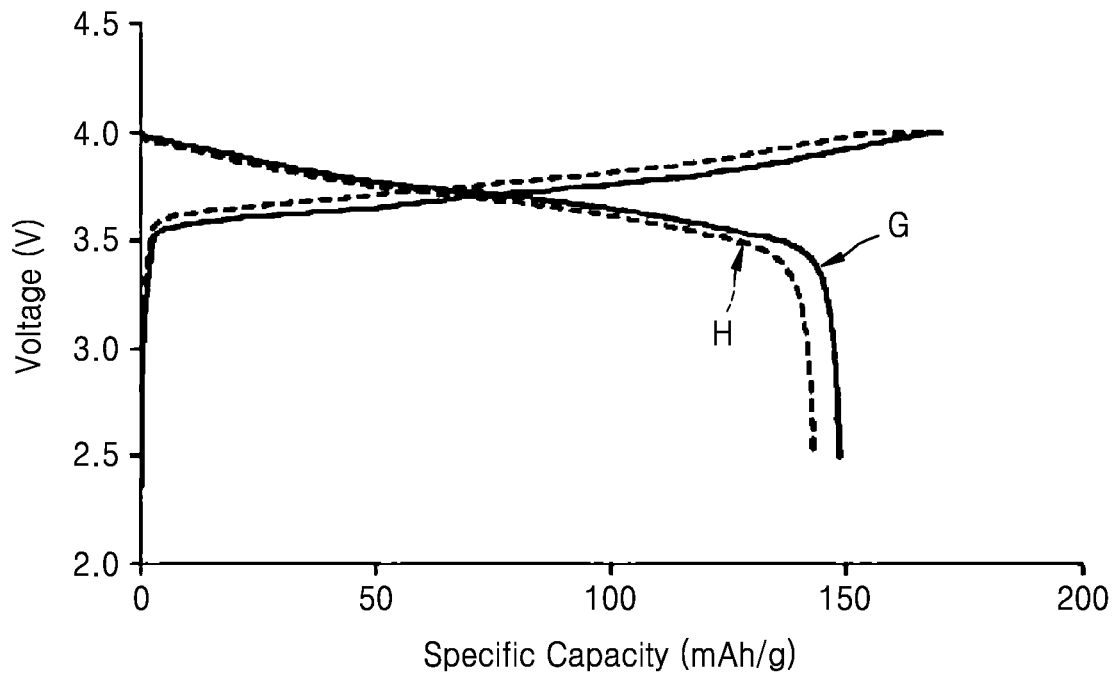
FIG. 3 is a graph of voltage (V) versus specific capacity (milliampere hours per gram, mAh/g) showing rate characteristics at 0.05 C of batteries prepared in Example 5 and Comparative Example 5.
Figure 4:
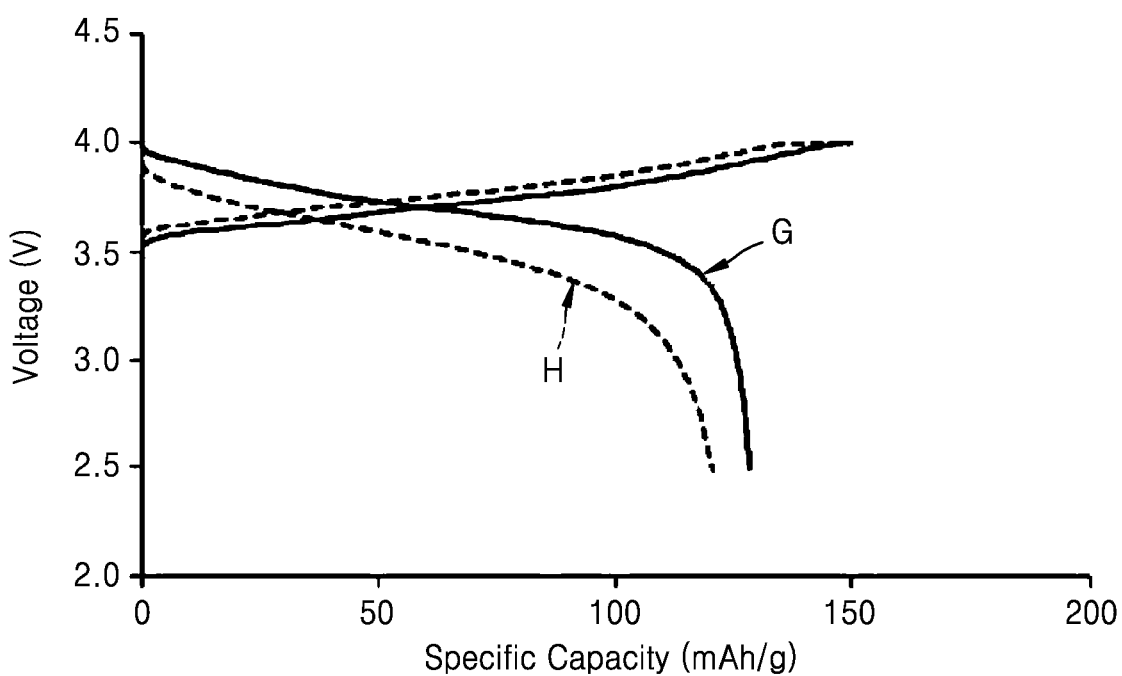
FIG. 4 is a graph of voltage (V) versus specific capacity (mAh/g) showing rate characteristics at 0.5 C of the batteries prepared in Example 5 and Comparative Example 5.
Figure 5:
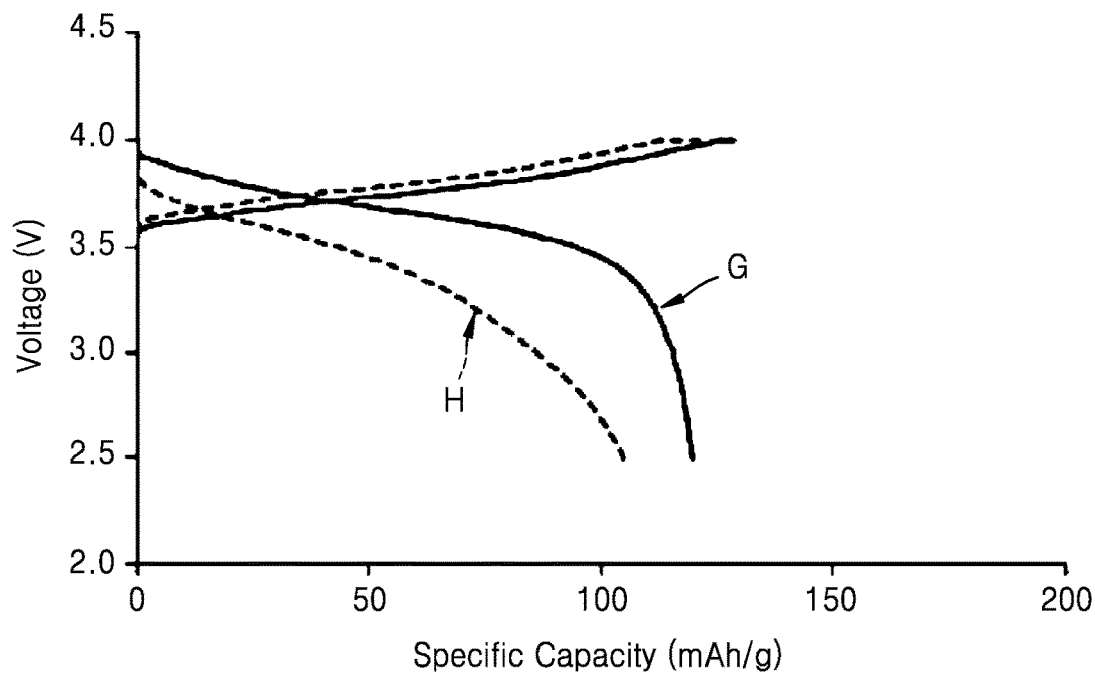
FIG. 5 is a graph of voltage (V) versus specific capacity (mAh/g) showing rate characteristics at 1 C of the batteries prepared in Example 5 and Comparative Example 5.

In FIGS. 3 to 5, it may be known that a discharge curve of the battery prepared in Example 6 had a high voltage and a high electric capacity in all 0.05 C, 0.5 C, and 1 C. Particularly, when a discharge current increased, the batteries had a high voltage and a high electric capacity, compared to those of the battery prepared in Example 6.

Figure 6:
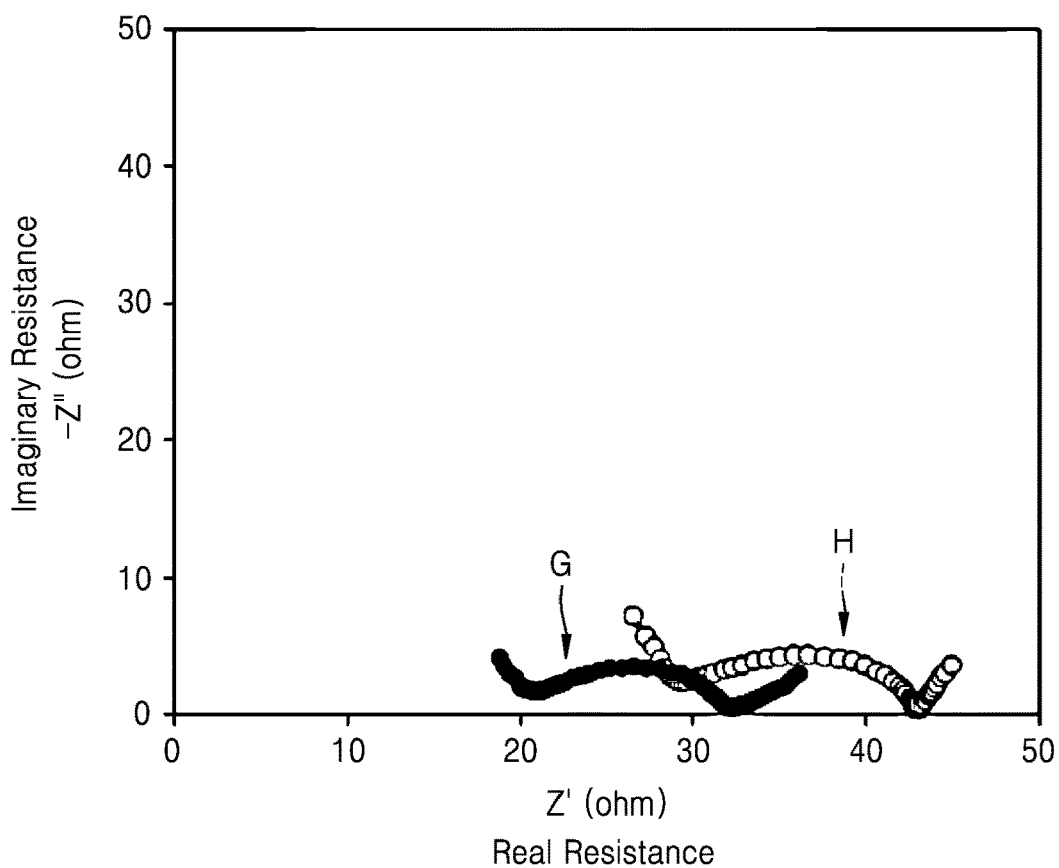
FIG. 6 is a graph of imaginary resistance (Z", ohms·cm$^2$) versus real resistance (Z', ohms·cm$^2$) showing internal resistance characteristics of the batteries prepared in Example 5 and Comparative Example 5.

In FIG. 6, a graph shape of the internal resistance was the same, but Z' of Example 6 was smaller than that of Comparative Example 5, and thus it may be known that a resistance of the solid electrolyte between the cathode and the anode was small.

Other Examples

Examples described above are provided herein as examples, and the present disclosure is not limited thereto.

M1 is not limited to Na. That is, M1 may be K instead of Na or a combination of a Na and K.

As a raw material used in preparation of the solid electrolyte, a sodium halide or a potassium halide may be used as precursors to a lithium halide.

M2 is not limited to Cl and one selected from Br, F, and I or any material including Cl may be used. Any of Br, F, and I may be used.

As described above, according to one or more embodiments, the solid electrolyte has a trace amount of at least one selected from Na, K, and a combination thereof with respect to Li, and thus is stable with respect to a metal lithium and has a desirably high ion conductivity at the same time.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A solid electrolyte for an all-solid secondary battery, the solid electrolyte comprising a compound of Formula 1:

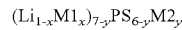

Formula 1 wherein, in Formula 1,
M1 is Na,
M2 is Cl, and
molar amounts of Li and M1 satisfy $0.01 \leq M1/(Li+M1) \leq 0.07$, and
x and y satisfy $0 < x \leq 0.07$ and $0 < y \leq 2$, and
wherein the solid electrolyte has peaks at positions of $15.42° \pm 0.50°$ 2θ, $17.87° \pm 0.50°$ 2θ, $25.48° \pm 0.50°$ 2θ, $30.01° \pm 0.50°$ 2θ, and $31.38° \pm 0.50°$ 2θ when analyzed by X-ray diffraction using CuKα radiation.

2. The solid electrolyte of claim 1, wherein the solid electrolyte has an Argyrodite structure.

3. The solid electrolyte of claim 1, wherein the solid electrolyte further comprises a first peak at a position of $30.01° \pm 0.50°$ 2θ and at a second peak at a position of $33.65° \pm 0.50°$ 2θ when analyzed by X-ray diffraction using CuKα radiation, and
wherein a ratio of an intensity of the second peak to an intensity of the first peak is less than about 0.1.

4. The solid electrolyte of claim 1 comprising $(Li_{5.6925}Na_{0.0575})PS_{4.75}Cl_{1.25}$.

5. A secondary battery comprising:
a cathode comprising a cathode active material;
an anode comprising an anode active material; and
a solid electrolyte layer comprising the solid electrolyte of claim 1.

6. The secondary battery of claim 5, wherein the cathode active material comprises at least one of a lithium cobalt oxide, a lithium nickel oxide, a lithium nickel cobalt oxide, a lithium nickel cobalt aluminum oxide, a lithium nickel cobalt manganese oxide, a lithium manganese oxide, a lithium iron phosphate, a nickel sulfide, a copper sulfide, sulfur, an iron oxide, and a vanadium oxide.

7. The secondary battery of claim 6, wherein the cathode active material further comprises the solid electrolyte of claim 1 and carbon nanofibers.

8. The secondary battery of claim 5, wherein the anode active material comprises at least one of a carbon active material, a metal active material, an oxide active material.

9. The secondary battery of claim 5, wherein an average particle diameter of the solid electrolyte layer is in a range of about 1 micrometer to about 10 micrometers.

10. The secondary battery of claim 5, wherein a thickness of the solid electrolyte layer is in a range of about 10 micrometers to about 200 micrometers.

11. The secondary battery of claim 5, wherein the secondary battery is an all-solid secondary battery.

12. A method of preparing the solid electrolyte of claim 1, the method comprising:
mechanically milling a mixture comprising $Li_2S$, $P_2S_5$, and $M1_2S$ and $LiM2$, or $M1M2$ to obtain a glass; and
heat-treating the glass at a glass transition temperature or greater to convert the glass into and ion conductive glass ceramic and obtain the solid electrolyte.

13. The solid electrolyte of claim 1, wherein the solid electrolyte has an ion conductivity of greater than $2 \times 10^{-3}$ Siemens per centimeter.

14. A secondary battery comprising:
a cathode comprising a cathode active material able to reversibly intercalate lithium ions;
an anode comprising an anode active material comprising lithium; and
a solid electrolyte layer comprising a solid electrolyte of the formula $(Li_{1-x}Na_x)_{7-y}PS_{6-y}Cl_y$,
wherein
molar amounts of Li and Na satisfy $0.01 \leq M1/(Li+Na) \leq 0.07$, and
x and y satisfy $0 < x \leq 0.07$ and $0 < y \leq 2$.

* * * * *